(12) United States Patent
Styles et al.

(10) Patent No.: US 8,960,166 B2
(45) Date of Patent: Feb. 24, 2015

(54) SYSTEMS AND METHODS FOR HEATING A PRE-COMPRESSOR DUCT TO REDUCE CONDENSATE FORMATION

(71) Applicant: Ford Global Technologies, LLC, Dearborn, MI (US)

(72) Inventors: Daniel Joseph Styles, Canton, MI (US); James Alfred Hilditch, Canton, MI (US); Lynn Aimee Chesney, Flat Rock, MI (US); Karen Elizabeth Maceroni, Casco, MI (US); Keith Michael Plagens, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/908,786

(22) Filed: Jun. 3, 2013

(65) Prior Publication Data
US 2014/0352668 A1    Dec. 4, 2014

(51) Int. Cl.
  *F02G 5/00*     (2006.01)
  *F02M 31/04*    (2006.01)

(52) U.S. Cl.
  CPC .................................. *F02M 31/042* (2013.01)
  USPC ........................................................ 123/552

(58) Field of Classification Search
  USPC ........................................................ 123/552
  See application file for complete search history.

(56) References Cited

U.S. PATENT DOCUMENTS

| | | | |
|---|---|---|---|
| 5,038,725 A * | 8/1991 | Okazaki et al. | 123/184.61 |
| 6,073,615 A * | 6/2000 | Anderson et al. | 123/549 |
| 6,073,617 A * | 6/2000 | Busato et al. | 123/568.18 |
| 7,322,191 B2 | 1/2008 | Tonetti et al. | |
| 7,451,750 B1 * | 11/2008 | Fox et al. | 123/568.12 |
| 7,624,575 B2 | 12/2009 | Noelle et al. | |
| 7,886,705 B2 * | 2/2011 | Holler et al. | 123/142.5 R |
| 8,056,338 B2 | 11/2011 | Joergl et al. | |
| 8,122,717 B2 | 2/2012 | Joergl et al. | |
| 2006/0137665 A1 * | 6/2006 | Khair et al. | 123/568.12 |
| 2006/0150959 A1 * | 7/2006 | Prust et al. | 123/549 |
| 2006/0180103 A1 * | 8/2006 | Gruia | 123/41.31 |
| 2007/0144170 A1 | 6/2007 | Griffith | |
| 2007/0234792 A1 * | 10/2007 | Durand | 73/170.26 |
| 2008/0011248 A1 * | 1/2008 | Cutlip et al. | 123/3 |
| 2009/0249783 A1 * | 10/2009 | Gokhale et al. | 60/602 |
| 2010/0205949 A1 | 8/2010 | Bolda et al. | |
| 2011/0011084 A1 | 1/2011 | Yanagida et al. | |
| 2011/0203769 A1 * | 8/2011 | Cors | 165/67 |

(Continued)

FOREIGN PATENT DOCUMENTS

WO    2010123899 A1    10/2010

OTHER PUBLICATIONS

Cunningham, Ralph Wayne et al., "Boosted Engine Charge Air Cooler Condensation Reduction Device," U.S. Appl. No. 13/693,874, filed Dec. 4, 2012, 32 pages.

*Primary Examiner* — Marguerite McMahon
*Assistant Examiner* — James Kim
(74) *Attorney, Agent, or Firm* — Julia Voutyras; Alleman Hall McCoy Russell & Tuttle LLP (57) ABSTRACT

Methods and systems are provided for providing auxiliary heat to a pre-compressor duct wall to reduce condensate formation. A coolant valve may control the delivery of heated engine coolant to the pre-compressor duct wall. The coolant valve may be adjusted based on condensate formation at the pre-compressor duct wall.

20 Claims, 5 Drawing Sheets

(56) References Cited

U.S. PATENT DOCUMENTS

| | | |
|---|---|---|
| 2011/0214421 A1 | 9/2011 | Schmitt et al. |
| 2012/0167862 A1* | 7/2012 | Nishimori et al. ....... 123/568.12 |
| 2013/0269664 A1* | 10/2013 | Park et al. ................ 123/568.29 |
| 2013/0284146 A1* | 10/2013 | Tsujita et al. ................. 123/297 |

* cited by examiner

SYSTEMS AND METHODS FOR HEATING A PRE-COMPRESSOR DUCT TO REDUCE CONDENSATE FORMATION

BACKGROUND/SUMMARY

Engines may utilize a turbocharger or supercharger to compress ambient air entering the engine in order to increase power. Further, engines may recirculate a portion of exhaust gas from an exhaust passage to an intake passage, upstream of a compressor of the turbocharger. The recirculation of the exhaust gas may be referred to as low pressure exhaust gas recirculation (LP EGR). LP EGR may result in water condensation before the compressor due to the high water vapor content of the exhaust gas. When a temperature of the pre-compressor duct wall and/or a temperature of the EGR and intake air mixture fall below a dew point temperature, condensate may form in the pre-compressor duct of the compressor. Condensation at the pre-compressor duct wall may increase a risk of compressor wheel damage due to water droplet impingement. This may, in turn, lead to degraded noise, vibration, and harshness (NVH), degraded compressor performance, and damage to the engine due to compressor wheel erosion.

Other attempts to address compressor wheel damage from condensate include separating condensate from the LP EGR flow to avoid water droplets on the compressor wheel. One example approach is shown by Joergl et al. in U.S. Pat. No. 8,056,338. Therein, a dispersion apparatus is used to separate condensate from the EGR flow stream and then re-introduce the condensate at the axis of the compressor wheel to reduce corrosion of the compressor wheel.

However, the inventors herein have recognized potential issues with such systems. As one example, re-introducing condensate at the axis of the compressor wheel may still result in corrosion of the compressor wheel. Specifically, while separating condensate from the EGR flow may reduce condensate formation on the compressor wheel, not all condensate may be removed by this method. Further, condensate may still form before the compressor when ambient temperatures decrease and/or humidity increases, thereby causing the air temperature entering the compressor to decrease below the dew point temperature and condensate to form.

In one example, the issues described above may be addressed by a method for adjusting heating to a pre-compressor duct in response to condensate formation in the pre-compressor duct. Heating to the pre-compressor duct may be increased in response to a temperature of the pre-compressor duct wall decreasing below a dew point temperature. The temperature of the pre-compressor duct wall may be estimated based on one or more of a temperature of the intake air and recirculated air (e.g., air from exhaust gas recirculation) mixture in the pre-compressor duct, a temperature of gases in an exhaust gas recirculation system, an air flow rate, an exhaust gas recirculation flow rate, an ambient air temperature and vehicle speed. In one example, increasing heating to the pre-compressor duct may include activating an electric heating element embedded in the wall of the pre-compressor duct. In another example, increasing heating to the pre-compressor duct may include increasing a delivery rate of engine coolant to the pre-compressor duct wall. In some examples, heated engine coolant may first pass through an EGR valve integrated into the pre-compressor duct, thereby cooling the warmer EGR valve. The heated engine coolant may then pass through the pre-compressor duct wall, thereby increasing the temperature of the pre-compressor duct wall. In this way, the pre-compressor duct wall may be heated above the dew point temperature, thereby reducing condensate and subsequently, degradation of the compressor wheel.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
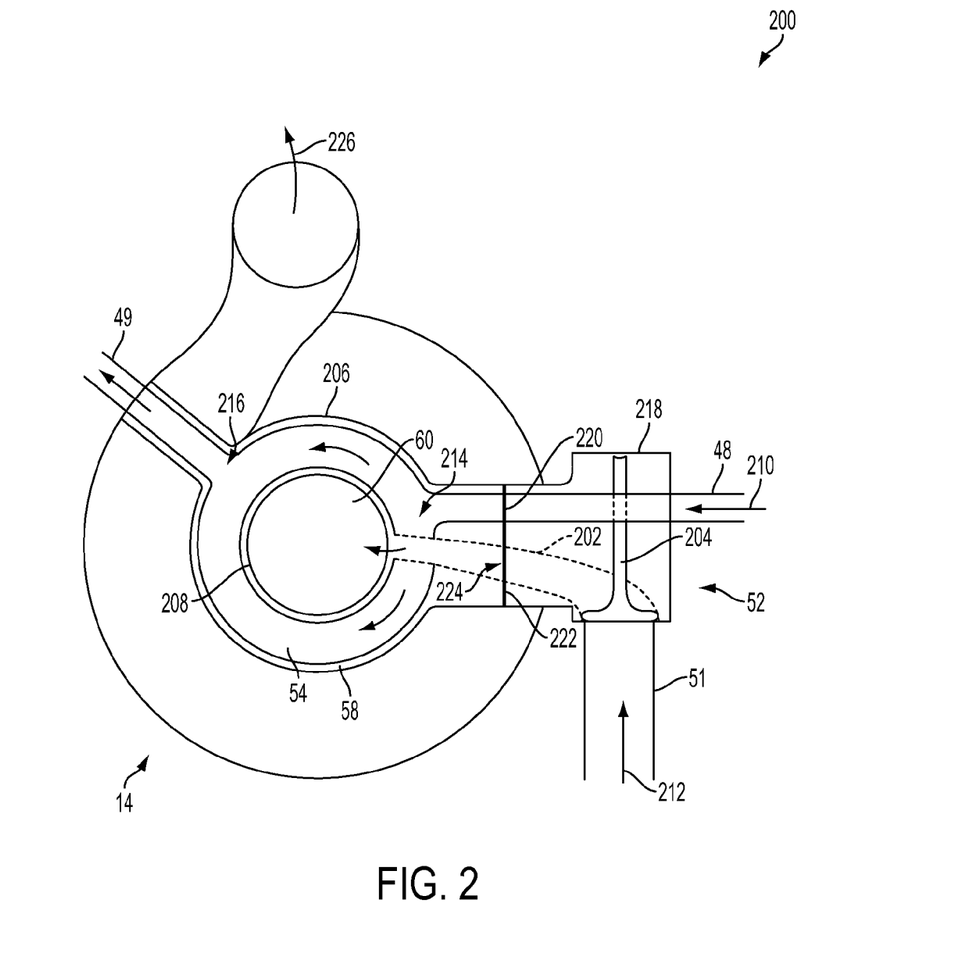
FIG. 2 is a schematic of an engine coolant path through a pre-compressor duct and an EGR valve.
Figure 3:
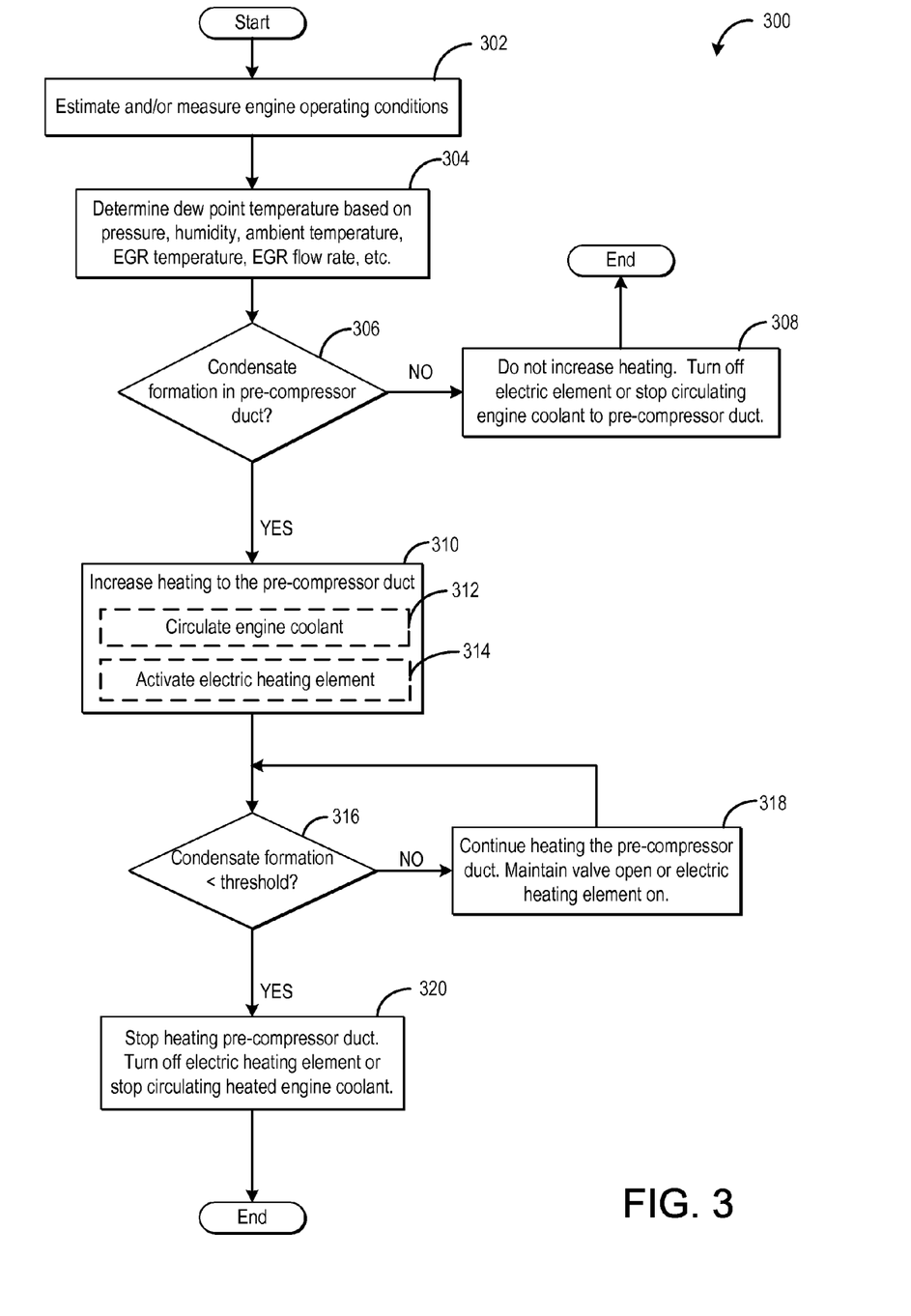
FIG. 3 is a flow chart of a method for adjusting heating to a pre-compressor duct wall.
Figure 4:
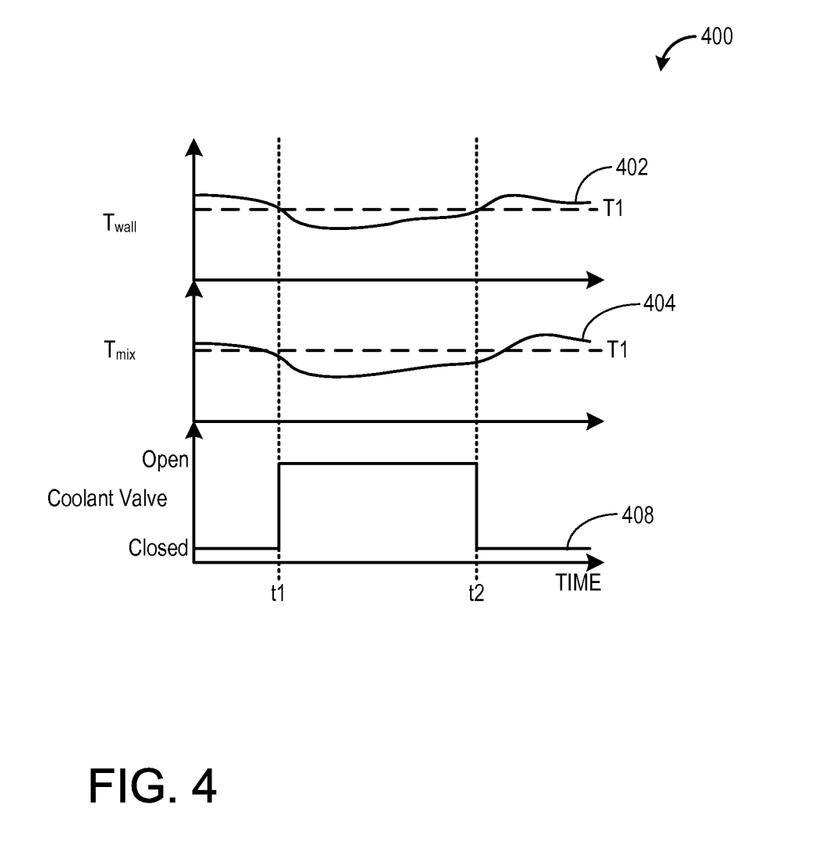
FIG. 4 shows a graphical example of adjustments to a coolant valve based on condensate formation at a pre-compressor duct.

The following description relates to systems and methods for providing heat to a pre-compressor duct to reduce condensate formation. Heating to a wall of the pre-compressor duct in an engine system, such as the engine system of FIGS. 1A-B, may be adjusted in response to condensate formation at the pre-compressor duct wall. In one example, adjusting heating may include adjusting a delivery rate of heated engine coolant to the pre-compressor duct wall. The heated engine coolant may also be delivered to an exhaust gas recirculation (EGR) valve integrated into the pre-compressor duct. An engine coolant path through the EGR valve and the pre-compressor duct is shown at FIG. 2. In another example, adjusting heating may include activating an electric heating element embedded in the pre-compressor duct wall. A method for adjusting the delivery of heated engine coolant to the pre-compressor duct wall, based on condensate formation, is shown at FIG. 3. A coolant valve may be adjusted in response to an estimated pre-compressor duct wall temperature. FIG. 4 illustrates example adjustments to the coolant valve in response to condensate formation at the pre-compressor duct.

Figure 1A:
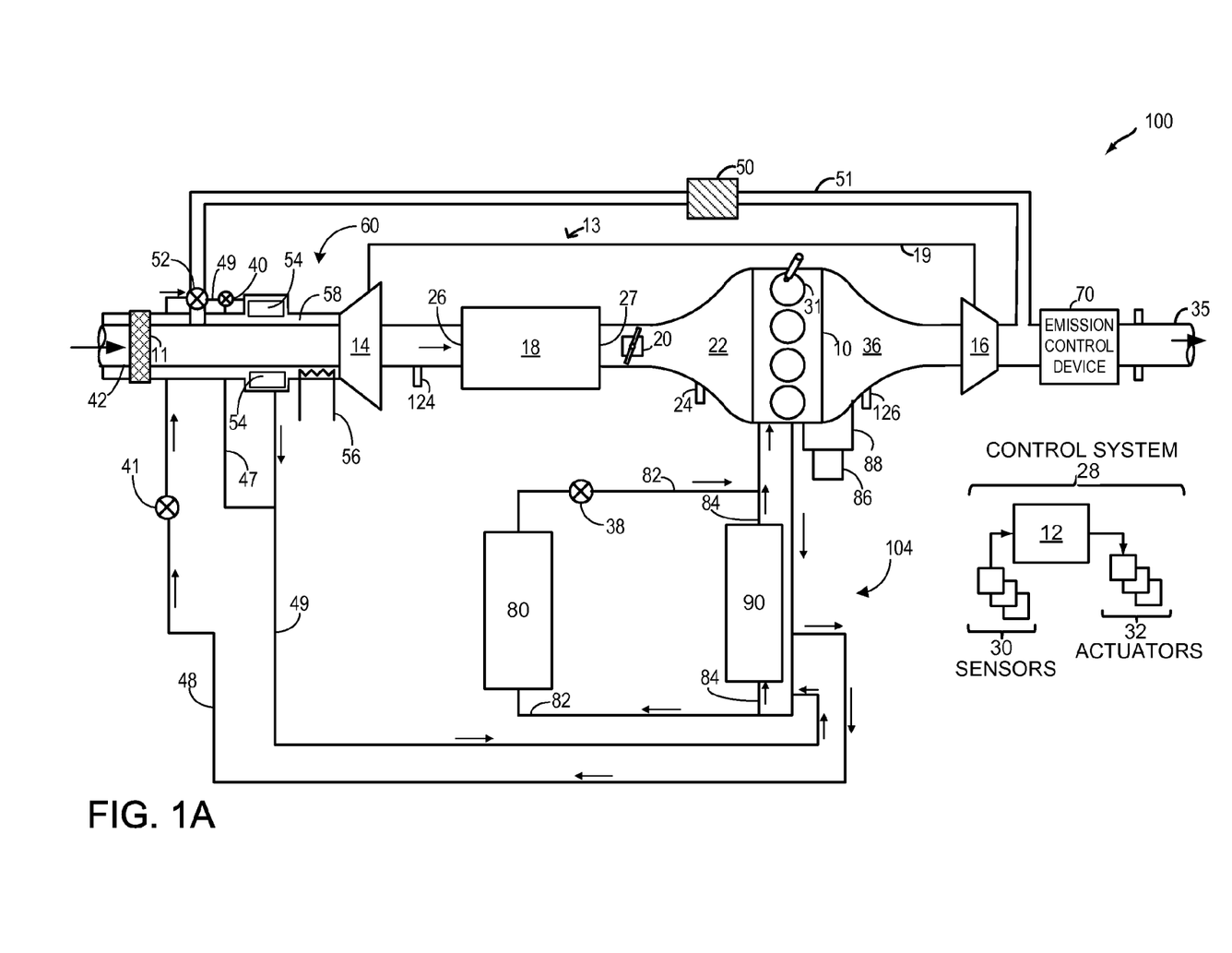
FIGS. 1A-B are schematic diagrams of an example engine system including a pre-compressor duct and a cooling system.
Figure 1B:
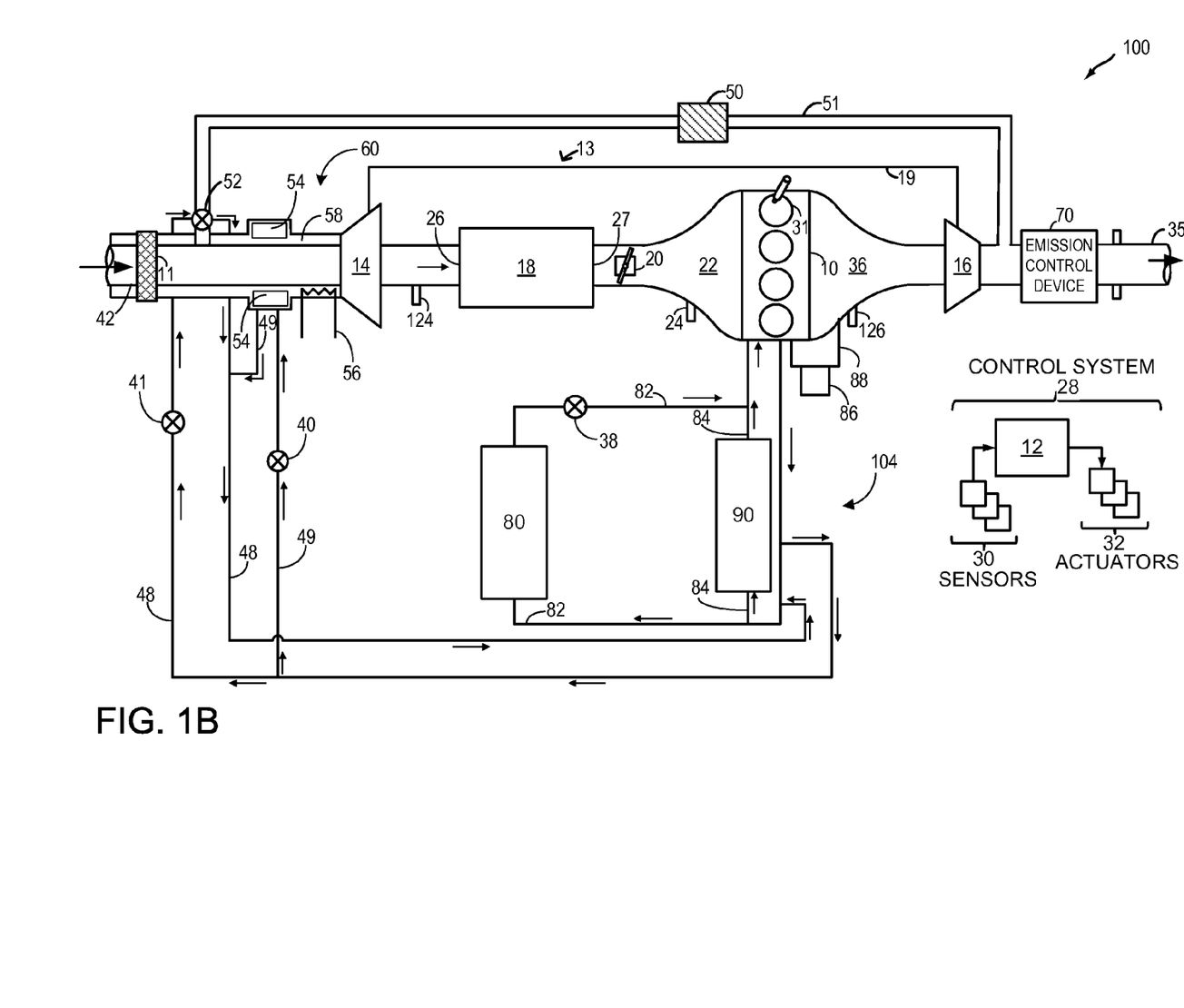

FIGS. 1A-B show example embodiments of an engine system 100, in a motor vehicle, illustrated schematically. Engine system 100 may be included in a vehicle such as a road vehicle, among other types of vehicles. While the example applications of engine system 100 will be described with reference to a vehicle, it should be appreciated that various types of engines and vehicle propulsion systems may be used, including passenger cars, trucks, etc.

In the depicted embodiments, engine 10 is a boosted engine coupled to a turbocharger 13 including a compressor 14 driven by a turbine 16. Specifically, fresh air is introduced along intake passage 42 into engine 10 via air cleaner 11 and flows to compressor 14. The compressor may be a suitable intake-air compressor, such as a motor-driven or driveshaft driven supercharger compressor. The compressor 14 may include a pre-compressor duct 60 which facilitates the flow of air/gas into the compressor 14. The pre-compressor duct 60 may have a wall 58 (e.g., pre-compressor duct wall) defined between an inner and outer diameter of the pre-compressor duct 60. In the engine system 100, the compressor is shown as a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIGS. 1A-B, compressor 14 is coupled, through charge air cooler (CAC) 18 to throttle valve 20. The CAC may be an air-to-air or air-to-water heat exchanger, for example. Throttle valve 20 is coupled to engine intake manifold 22. From the compressor, the hot compressed air charge enters the charge air inlet 26 of the CAC 18, cools as it travels through the CAC, and then exits the charge air outlet 27 to pass through the throttle valve to the intake manifold. Ambient air flow from outside the vehicle may enter engine 10 through a vehicle front end and pass across the CAC, to aid in cooling the charge air.

In the embodiments shown in FIGS. 1A-B, the pressure of the air charge within the intake manifold is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine air flow to avert compressor surge.

Intake manifold 22 is coupled to a series of combustion chambers 31 through a series of intake valves (not shown). The combustion chambers are further coupled to exhaust manifold 36 via a series of exhaust valves (not shown). In the depicted embodiments, a single exhaust manifold 36 is shown. However, in other embodiments, the exhaust manifold may include a plurality of exhaust manifold sections. Configurations having a plurality of exhaust manifold section may enable effluent from different combustion chambers to be directed to different locations in the engine system. Universal Exhaust Gas Oxygen (UEGO) sensor 126 is shown coupled to exhaust manifold 36 upstream of turbine 16. Alternatively, a two-state exhaust gas oxygen sensor may be substituted for UEGO sensor 126.

As shown in FIGS. 1A-B, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow.

All or part of the treated exhaust from emission control device 70 may be released into the atmosphere via exhaust conduit 35. Depending on operating conditions, however, some exhaust may be diverted instead to EGR passage 51, through EGR cooler 50 and EGR valve 52, to the inlet of compressor 14. In this manner, the compressor is configured to admit exhaust tapped from downstream of turbine 16. In some examples, as shown in FIGS. 1A-B, the EGR valve 52 may be integrated into the pre-compressor duct 60. Specifically, the EGR valve 52 may be coupled directly to the wall 58 of the pre-compressor duct 60. In alternate example, the EGR valve 52 may be positioned in the EGR passage 51, upstream of the pre-compressor duct 60, such that the EGR valve 52 is not integrated into the pre-compressor duct 60.

The EGR valve 52 may be opened to admit a controlled amount of cooled exhaust gas to the pre-compressor duct 60 (e.g., compressor inlet) for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and improved performance.

However, LP EGR may result in water condensation before the compressor. Specifically, the exhaust gases traveling through the LP EGR system may have a high water vapor content. When a temperature of the pre-compressor duct wall 58 (e.g., $T_{wall}$) and/or a temperature of the EGR and intake air mixture (e.g., $T_{mix}$) falls below a dew point temperature, condensate may form in the pre-compressor duct 60 of the compressor 14. The dew point temperature may be determined based on a pressure before the compressor 14 and a water vapor content (e.g., humidity) of the EGR and intake air mixture. Condensation may increase as ambient temperatures decrease and humidity increases. Condensate formation in the pre-compressor duct 60 may be further based on measured EGR flow rate, desired EGR flow rate, EGR temperature, intake air temperature and humidity, $T_{mix}$, and/or pressures before the compressor.

Condensation before the compressor and/or in the pre-compressor duct 60 may increase a risk of compressor wheel damage due to water droplet impingement. This may, in turn, lead to degraded noise, vibration, and harshness (NVH), degraded compressor performance, and damage to the engine due to compressor wheel erosion. Thus, condensation occurring at the wall 58 of the pre-compressor duct may be of primary concern due to larger droplet sizes and the tendency to condense on the colder wall surface. As such, an engine controller may determine a likelihood for condensate formation in the pre-compressor duct by comparing $T_{wall}$ to the dew point temperature. The pre-compressor duct wall temperature ($T_{wall}$) may be estimated based on one or more of a temperature of air in the pre-compressor duct, a temperature of exhaust gases exiting the EGR system and entering the pre-compressor duct, a flow rate of air in the pre-compressor duct, a flow rate of gas through the EGR system, ambient air temperature, and vehicle speed. In one example, experimental data can be collected and transfer functions developed to provide an accurate estimate of pre-compressor duct wall temperature based on the aforementioned factors. As discussed further below, increasing the pre-compressor duct wall temperature may reduce condensate formation and compressor wheel damage. In one example, heating the pre-compressor duct wall may increase $T_{wall}$ above the dew point temperature, thereby reducing condensate formation. Methods for delivering heat and adjusting heating to the pre-compressor wall responsive to condensate forming conditions are discussed further below at FIGS. 2-4.

Engine system 100 further includes a cooling system 104 (e.g., engine coolant circuit) that circulates coolant through internal combustion engine 10 to absorb waste heat and distributes the heated coolant to radiator 80, heater core 90, the EGR valve 52 and/or a pre-compressor duct wall 58 via coolant lines 82, 84, 48, and 49, respectively. In particular, FIGS. 1A-B show cooling system 104 coupled to engine 10 and circulating engine coolant from engine 10 to radiator 80 via engine-driven water pump 86, and back to engine 10 via coolant line 82. Engine-driven water pump 86 may be coupled to the engine via front end accessory drive (FEAD) 88, and rotated proportionally to engine speed via belt, chain, etc. Specifically, engine-driven water pump 86 circulates coolant through passages in the engine block, head, etc., to absorb engine heat, which is then transferred via the radiator 80 to ambient air. In an example where engine-driven water pump 86 is a centrifugal pump, the pressure (and resulting flow) produced may be proportional to the crankshaft speed, which in the example of FIGS. 1A-B, is directly proportional to engine speed. In another example, a motor-controlled pump may be used that can be adjusted independently of engine rotation. The temperature of the coolant may be regulated by a thermostat valve 38, located in the coolant line 82, which may be kept closed until the coolant reaches a threshold temperature. Coolant may flow through coolant line 82, as described above, and/or through coolant line 84 to heater core 90 where the heat may be transferred to a passenger compartment, and the coolant flows back to engine 10. In some examples, engine-driven water pump 86 may operate to circulate the coolant through coolant lines 82, 84, and 48.

Engine coolant may also be circulated from the engine to the EGR valve 52. Specifically, heated engine coolant may flow through a portion of the EGR valve 52 via coolant line 48. Heat may exchange between the heated engine coolant and EGR valve components (e.g., the electric motor and/or the position sensor). The temperature of the EGR valve may be higher than the heated engine coolant entering the valve. As a result, a temperature of the heated engine coolant exiting the EGR valve 52 may be higher than a temperature of the heated engine coolant entering the EGR valve 52. An optional EGR coolant valve 41 may control the flow of heated engine coolant to the EGR valve 52. For example, if the EGR valve 52 does not need cooling (e.g., EGR valve temperature is below a threshold), the controller 12 may close the EGR coolant valve 41. However, if the EGR valve 52 requires cooling, the controller 12 may open or maintain the EGR coolant valve 41 opened. In another example, the engine system may not include the EGR coolant valve 41 and engine coolant may always flow through coolant line 48 and through the EGR valve 52 to cool the valve.

Heated engine coolant may further be delivered to a coolant annulus 54, the coolant annulus 54 embedded within the pre-compressor duct wall 58, via coolant line 48. Specifically, the coolant annulus may extend around a circumference of the pre-compressor duct 60. A coolant valve 40 may control the flow of heated engine coolant to the coolant annulus 54. For example, when coolant valve 40 is open, heated engine coolant may flow through coolant line 49 and be delivered to the coolant annulus 54. The heated coolant may flow through the coolant annulus 54 where heat may exchange between the heated engine coolant and the pre-compressor duct wall 58. As a result, the pre-compressor duct wall temperature may increase, thereby reducing condensate formation at the pre-compressor duct wall. The temperature of the air flowing through the pre-compressor duct 60 may also increase as the pre-compressor duct wall temperature increases. After flowing through the coolant annulus 54, the engine coolant returns to the coolant flow of the cooling system 104.

In a first embodiment, as shown in FIG. 1A, heated engine coolant may flow from the cooling system 104, through the coolant line 48, and through the EGR valve 52. From the EGR valve 52, the heated coolant (may be further heated after passing through the EGR valve 52) may then flow through the coolant line 49, between the EGR valve 52 and the coolant annulus 54. In this embodiment, the coolant valve 40 is positioned in the coolant line 49, between the EGR valve 52 and the coolant annulus 54. When the coolant valve 40 is open to the coolant annulus 54 (referred to herein as an open position), heated coolant may flow from the EGR valve 52 and through the coolant annulus 54. After flowing through the coolant annulus 54, the engine coolant returns via the coolant line 49 to the cooling system 104. Alternatively, when the coolant valve 40 is closed to the coolant annulus 54 (referred to herein as a closed position), heated coolant bypasses the coolant annulus 54 via a bypass coolant line 47. From the bypass coolant line 47, engine coolant enters the coolant line 49 and returns to the coolant flow of the cooling system 104. In some examples, the coolant valve 40 may be adjustable into a plurality of positions between fully open and fully closed such that varying amounts of heated engine coolant may flow through the coolant annulus 54. In an alternate embodiment, heated coolant flow to the coolant annulus 54 may not be actively controlled. In this embodiment, the engine system 100 may not include the coolant valve 40. As such, heated engine coolant may always flow through the EGR valve 52 and the coolant annulus 54. In this way, the flow of heated engine coolant to the EGR valve 52 and the coolant annulus 54 may be passively controlled.

In a second embodiment, as shown in FIG. 1B, heated engine coolant may flow from the cooling system 104, through the coolant line 48, through the EGR valve 52, and back to the cooling system 104 via coolant line 48. Heated engine coolant may also flow from cooling system 104 and the coolant line 48, upstream of the EGR valve 52, and to the coolant line 49. The coolant valve 40 may be positioned in the coolant line 49, upstream of the coolant annulus 54. When the coolant valve 40 is open, heated engine coolant may also flow through the coolant line 49 and through the coolant annulus 54. After flowing through the coolant annulus 54, the engine coolant joins the returning coolant flow from the EGR valve 52 in coolant line 48 and returns to the cooling system 104. As shown in FIG. 1B, the coolant flow through the EGR valve 52 and the coolant flow through the coolant annulus 54 are maintained separate from one another. In one example, heated engine coolant may always flow through the EGR valve 52 while heated engine coolant flow to the coolant annulus 54 may be controlled with coolant valve 40.

In this way, heat may be transferred from heated engine coolant to the pre-compressor duct wall 58, thereby increasing the temperature of the pre-compressor duct wall 58. By increasing the temperature of the pre-compressor duct wall 58, the pre-compressor duct wall temperature and/or the temperature of the air passing through the pre-compressor duct wall may remain above the dew point temperature. As a result, condensate formation at the pre-compressor duct wall 58 may be reduced. The engine system 100 may include various temperature, pressure, and humidity sensors to determine conditions for condensate formation.

In an alternate example, heated engine coolant may not be delivered to the EGR valve 52. In this example, the coolant line 48 may be coupled only to the coolant annulus 54 so heated engine coolant flows only through the coolant annulus 54 and then back to the coolant circuit of cooling system 104. Thus, the coolant valve 40 may control the flow of heated engine coolant to the coolant annulus 54 of the pre-compressor duct wall 58.

FIG. 2 shows a schematic 200 of a cross-section of the pre-compressor duct 60 of the compressor 14 and the EGR valve 52 integrated into the pre-compressor duct 60. Additionally, the schematic 200 includes an engine coolant path passing through the EGR valve 52 and the pre-compressor duct wall 58. As shown in FIG. 2, the EGR valve 52 is coupled to the pre-compressor duct 60 at a side of the pre-compressor duct. Specifically, the EGR valve 52 includes an engine coolant connection 220 and an exhaust gas recirculation (EGR) connection 222 on a common mounting surface 224. The common mounting surface 224 then mounts (e.g., couples) to the pre-compressor duct wall 58 of the pre-compressor duct 60.

The EGR valve 52 includes a valve body 218 and a valve plate 204. The valve body 218 may include temperature sensitive components including an electric motor and a position sensor. Exhaust gases 212 from the EGR system flow through the EGR passage 51 and to the EGR valve 52. When the valve plate 204 of the EGR valve 52 opens, exhaust gases 212 pass from the EGR passage 51, to an EGR outlet passage 202. The EGR outlet passage 202 passes through the pre-compressor duct wall 58. As such, the exhaust gases 212 flow into the pre-compressor duct 60 which is the inlet to the compressor 14. The EGR exhaust gases then mix with intake air within the pre-compressor duct 60. The combined air mixture then flows into the compressor 14. The compressor 14 then compresses the incoming air and compressed air 226 exits the compressor at a compressor outlet.

The coolant line 48 (e.g., engine coolant path) is coupled to the EGR valve 52 and runs through a housing of the EGR valve 52 to cool the internal components of the EGR valve 52. After passing through the EGR valve housing and valve body 218, the coolant line (e.g., coolant line 49 shown in FIG. 1A) passes through the pre-compressor duct wall 58 and connects to the coolant annulus 54 at a coolant annulus inlet 214. As described above, the coolant annulus 54 is embedded within the pre-compressor duct wall 58, between an outer diameter 206 and an inner diameter 208 of the pre-compressor duct 60. The coolant annulus 54 is further coupled to the outgoing coolant line 49 (e.g., returning to the cooling system 104) at a coolant annulus outlet 216, the coolant annulus outlet 216 on an opposite side of the pre-compressor duct 60 from the coolant annulus inlet 214. Thus, heated engine coolant 210 may pass first through the EGR valve body 218 of the EGR valve 52 and then into and through the coolant annulus 54. Within the coolant annulus 54, the heated engine coolant flows circumferentially around the pre-compressor duct to the coolant annulus outlet 216. Finally, heated engine coolant flows out the coolant annulus outlet 216 and back into the coolant line 48 to return to the cooling system 104.

The coolant line passing through the pre-compressor duct wall 58 may also include a coolant valve (such as coolant valve 40 shown in FIG. 1A) between the EGR valve 52 and the coolant annulus 54 (not shown in FIG. 2). As discussed above, the coolant valve may control the flow of heated engine coolant from the housing of the EGR valve and to the coolant annulus 54. In some examples, when the coolant valve is closed to the coolant annulus, heated coolant may flow from the EGR valve 52 and back to the engine cooling system without passing through the coolant annulus 54. In this way, the EGR valve 52 may be cooled without heating the pre-compressor duct wall 58.

As shown in FIG. 2, a pre-compressor duct of an engine includes a pre-compressor duct wall including a coolant annulus positioned within and around a circumference of the pre-compressor duct wall. The pre-compressor duct further includes, an exhaust gas recirculation valve including an engine coolant connection and an exhaust gas recirculation connection on a common mounting surface, the common mounting surface coupled to the pre-compressor duct wall. Finally, an engine coolant path passes through a body of the exhaust gas recirculation valve and the coolant annulus. The engine coolant path is coupled to an engine coolant circuit and wherein the engine coolant path includes an engine coolant valve positioned downstream of the exhaust gas recirculation valve and upstream of the coolant annulus. When the coolant valve is opened heated engine coolant flows from the engine coolant circuit, through the exhaust gas recirculation valve, through the coolant annulus, and then back to the engine coolant circuit.

Returning to FIGS. 1A-B, the engine system 100 further includes a control system 28. Control system 28 may be communicatively coupled to various components of engine system 100 to carry out the control routines and actions described herein. For example, as shown in FIGS. 1A-B, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as transmission gear position, gas pedal input, brake input, transmission selector position, vehicle speed, engine speed, mass airflow through the engine, boost pressure, ambient temperature, ambient humidity, intake air temperature, fan speed, etc.), cooling system sensors (such as coolant temperature, passenger compartment temperature, ambient humidity, etc.), CAC 18 sensors (such as CAC inlet air temperature and pressure, CAC outlet air temperature and pressure, etc.), and others.

In some embodiments, controller 12 may receive data from a GPS and/or an in-vehicle communications and entertainment system of the vehicle (not shown). The in-vehicle communications and entertainment system may communicate with a wireless communication device via various wireless protocols, such as wireless networks, cell tower transmissions, and/or combinations thereof. Data obtained from the in-vehicle communications and entertainment system may include real-time and forecasted weather conditions. Weather conditions, such as temperature, precipitation (e.g., rain, snow, hail, etc.), and humidity, may be obtained through various wireless communication device applications and weather-forecasting websites. Data obtained from the in-vehicle communications and entertainment system may include current and predicted weather conditions for the current location, as well as future locations along a planned travel route. In one example, the wireless communication device may relay real-time humidity data to the in-vehicle communications and entertainment system, and/or GPS, which is then relayed to the controller 12. The controller 12 may use humidity and precipitation date to predict and/or calculate condensate formation at the pre-compressor duct 60. As such, the controller may then use predicted condensate formation to control heating to the pre-compressor duct 60 to reduce condensate formation. For example, the controller may use the above data to control delivery of heated engine coolant to the coolant annulus 54 within the pre-compressor duct wall 58.

In other embodiments, the presence of rain and/or high humidity may be inferred from other signals or sensors (e.g., rain sensors). In one example, rain may be inferred from a vehicle windshield wiper on/off signal. Specially, in one example, when the windshield wipers are on, a signal may be sent to controller 12 to indicate rain. The controller may use this information to predict the likelihood of condensate formation at the pre-compressor duct 60 and adjust vehicle actuators, such as heating to pre-compressor duct wall 58. Adjustments to pre-compressor duct wall heating are described in more detail below with reference to FIGS. 3-4.

Furthermore, controller 12 may communicate with various actuators 32, which may include engine actuators (such as fuel injectors, an electronically controlled intake air throttle plate, spark plugs, etc.), cooling system actuators (such as air handling vents and/or diverter valves in the passenger compartment climate control system, etc.), and others. In some examples, the storage medium may be programmed with computer readable data representing instructions executable by the processor for performing the methods described below as well as other variants that are anticipated but not specifically listed.

As described above, condensate formation in a pre-compressor duct may be reduced by increasing the wall temperature of the pre-compressor duct. Supplying heat to the pre-compressor duct may increase the wall temperature of the pre-compressor duct and thereby reduce condensation at the wall surface. In one example, as described above, heat may be supplied to the pre-compressor duct wall 58 by delivering heated engine coolant to a coolant annulus 54 wrapped around pre-compressor duct 60 and embedded within the pre-compressor duct wall 58. In another example, heat may be supplied to the pre-compressor duct wall 58 with an electric heating element 56. As shown in FIGS. 1A-B, the electric heating element 56 may be embedded within the pre-compressor duct wall 58. The electric heating element 56 may be powered with an electric power source and controlled with the controller 12. For example, the controller 12 may activate or turn on the electric heating element 56 to increase heating to the pre-compressor duct wall 58. In another example, the controller 12 may deactivate or turn off the electric heating element to stop and/or decrease heating to the pre-compressor duct wall 58.

In some embodiments, the pre-compressor duct wall 58 may include both the coolant annulus 54 and the electric heating element 56. In this example, the controller may adjust one or both of these heating elements to maintain the pre-compressor duct wall temperature above the dew point temperature. In one example, if EGR valve 52 does not need to be cooled, the controller may only provide heat to the pre-compressor duct wall through the electric heating element 56. In another example, if condensate formation is above a threshold, the controller may provide heat to the pre-compressor duct wall through both the electric heating element 56 and the coolant annulus 54. In other embodiments, the pre-compressor duct wall 58 may include only one of the coolant annulus 54 or the heating element 56 as the heating means.

The systems of FIGS. 1-2 provide for an engine system including a turbocharger, the turbocharger including a compressor, and the compressor including a pre-compressor duct. The engine system may further include an exhaust gas recirculation system coupled between an exhaust passage, downstream of a turbine of the turbocharger, and the pre-compressor duct, the exhaust gas recirculation system including an exhaust gas recirculation valve, the exhaust gas recirculation valve integrated into the pre-compressor duct and configurable to adjust a flow of exhaust gas to the pre-compressor duct. The engine system further includes a coolant circuit coupled between the pre-compressor duct and the exhaust gas recirculation valve, the coolant circuit including a coolant valve. The coolant circuit may be coupled to an engine coolant circuit. Further, when the coolant valve is opened, heated engine coolant flows from the engine coolant circuit, through the exhaust gas recirculation valve, through a coolant annulus positioned within the wall of the pre-compressor duct, and then back to the engine coolant circuit. Finally, the engine system may include a controller with computer readable instructions for opening the coolant valve to flow heated engine coolant through the exhaust gas recirculation valve and then through a wall of the pre-compressor duct responsive to condensate formation in the pre-compressor duct. Condensate formation in the pre-compressor duct may be based on one or more of the flow rate of exhaust gas to the pre-compressor duct, a temperature of the exhaust gas in the exhaust gas recirculation system, a flow rate of the intake air, a temperature of intake air, a humidity, a vehicle speed, and an ambient temperature.

Now turning to FIG. 3, a method 300 is shown for adjusting heating to a pre-compressor duct wall. In one example, the method 300 is executable by the controller 12 shown in FIGS. 1A-B. Specifically, the controller may adjust operation of a coolant valve and/or an electric heating element to adjust a wall temperature of the pre-compressor duct. The base condition for the coolant valve may be closed and the base condition for the electric heating element may be off. Additionally, as described below in the method 300, the controller may fully open and fully close the coolant valve. In an alternate embodiment, the controller may adjust the coolant valve to a plurality positions between fully opened and fully closed.

The method begins at 302 by estimating and/or measuring engine operating conditions. Engine operating conditions may include engine speed and load, boost pressure, induction pressure, pedal position, mass air flow, MAP, measured EGR flow rate, desired EGR flow rate, EGR temperature, humidity, engine temperature, engine coolant temperature, torque demand, pre-compressor duct conditions (e.g., pressure, temperature, humidity, etc.), ambient temperature, vehicle speed, etc. At 304, the method includes determining the dew point temperature in the pre-compressor duct based on the determined engine operating conditions. For example, the controller may estimate the dew point temperature based on pressure, temperature, and humidity in the pre-compressor duct, as well as the EGR temperature and flow rate. As discussed above, the dew point temperature may indicate at what conditions condensate may form in the pre-compressor duct.

At 306, the controller determines if condensate is forming or is likely to form in the pre-compressor duct. As discussed above, condensate formation in the pre-compressor duct may be indicated based on one or more of the flow rate of exhaust gas to the pre-compressor duct (e.g., EGR flow rate), a temperature of the exhaust gas in the EGR system (e.g., EGR temperature), a temperature of intake air, flow rate of intake air, a humidity, and an ambient temperature. In one example, the controller may estimate the temperature at the pre-compressor duct wall. The temperature of the pre-compressor duct wall may be estimated based on one or more of a temperature of the intake air and recirculated air (from the EGR system) mixture in the pre-compressor duct, EGR temperature, EGR flow rate, air flow rate, vehicle speed, and ambient air temperature. If the pre-compressor duct wall temperature is less than the dew point temperature, condensate may form in the pre-compressor duct. In another example, the controller may compare the pre-compressor duct air mixture temperature to the dew point temperature. If the pre-compressor duct air mixture temperature is below the dew point temperature, condensate formation may be indicated. In yet another example, alternate or additional conditions may be used at 306 to infer and/or determine condensate formation in the pre-compressor duct. For example, if humidity is greater than a threshold, condensate formation may be indicated. In yet another example, if the pre-compressor duct air mixture temperature and/or the temperature of the pre-compressor duct wall are decreasing and approaching the dew point temperature, the controller may determine that condensate may be likely to form, thereby adjusting heating to the pre-compressor duct wall, before the temperatures decrease below the dew point temperature.

If, at 306, the controller determines that condensate is not forming or is not likely to form in the pre-compressor duct (e.g., at the pre-compressor duct wall), the method continues on to 308 to not increase heating of the pre-compressor duct wall. This may include turning off a pre-compressor duct wall electric heating element if it is on and/or stopping circulating heated engine coolant to the pre-compressor duct wall. If the coolant valve is already closed, the controller may maintain the coolant valve closed so no heated coolant circulates to the EGR valve and/or pre-compressor duct wall.

Alternatively, if the controller determines that condensate is forming or is likely to form in the pre-compressor duct, specifically at the pre-compressor duct wall, the method continues on to 310. At 310, the controller increases heating to the pre-compressor duct. In one example, the controller may increase heating by circulating heated engine coolant to the pre-compressor duct wall at 312. As such, increasing heating may include increasing a delivery rate of heated engine coolant. Further, circulating and increasing the delivery rate of heated engine coolant may include fully opening a coolant valve (e.g., coolant valve 40 shown in FIGS. 1A-B). In another example, circulating heated engine coolant may include increasing the opening of the coolant valve. The amount of opening of the coolant valve may be based on one or more of the pre-compressor duct wall temperature, the temperature of the EGR/intake air mixture entering the compressor, the EGR flow rate, and/or additional system temperatures. For example, if the pre-compressor duct wall temperature is a greater amount below the dew point temperature, the controller may open the engine coolant valve by a greater amount, thereby increasing the delivery rate of heated engine coolant to the pre-compressor duct wall.

In another example, the controller may increase heating to the pre-compressor duct by activating an electric heating element (e.g., electric heating element 56 shown in FIGS. 1A-B) at 314. Activating the electric heating element may include turning on the heating element. In another example, the controller may adjust a temperature output by the electric heating element, the output temperature increasing with an increasing difference between the dew point temperature and the pre-compressor duct wall temperature.

At 316, the method includes determining if condensate formation is less than a threshold. In one example, this may include determining if the pre-compressor duct wall temperature is greater than the dew point temperature, thereby reducing condensate formation. In another example, this may include determining if the temperature of the intake air/exhaust gas mixture entering in the pre-compressor duct is greater than the dew point temperature. If condensate formation is not less than the threshold, thereby indicating that condensate is still forming in the pre-compressor duct, the method continues on to 318 to continue heating the pre-compressor duct. The method at 318 may include maintaining the coolant valve open and/or the electric heating element operating. However, if condensate formation is less than the threshold (e.g., the temperature of the pre-compressor duct wall is greater than the dew point temperature), the method continues on to 320 to stop heating the pre-compressor duct. In one example, stopping heating to the pre-compressor duct includes turning off the electric heating element. In another example, stopping heating to the pre-compressor duct includes stopping circulating heated engine coolant. Thus, the method at 320 may include closing the coolant valve.

In this way, an engine controller may adjust heating to a pre-compressor duct in response to condensate formation in the pre-compressor duct. In one example, the controller may increase heating in response to a temperature of the pre-compressor duct wall being less than a dew point temperature. The temperature of the pre-compressor duct wall may be based on one or more of a temperature of the intake air and recirculated air mixture in the pre-compressor duct, a temperature of gases in an exhaust gas recirculation system, an exhaust gas recirculation flow rate, an air flow rate, a vehicle speed, and an ambient air temperature.

In one example, increasing heating to the pre-compressor duct may include activating (e.g., turning on) an electric heating element embedded in a wall of the pre-compressor duct. In another example, increasing heating may include increasing a delivery rate of engine coolant to the pre-compressor duct wall. Increasing the delivery rate of engine coolant may include increasing an opening of a coolant valve. In one example, the coolant valve may be positioned in a coolant line flowing between an exhaust gas recirculation valve and the wall of the pre-compressor duct. In another example, the coolant valve may be positioned in a coolant line, upstream of the pre-compressor duct. Further, increasing the delivery rate of engine coolant may include first passing engine coolant through an exhaust gas recirculation valve, the exhaust gas recirculation valve integrated into the pre-compressor duct, and then passing the engine coolant through the pre-compressor duct wall. As such, heat may transfer from the exhaust gas recirculation valve to the heated engine coolant, thereby making the heated engine coolant hotter. The hotter heated engine coolant may then transfer heat to the pre-compressor duct wall before returning to the engine coolant circuit.

The controller may also decrease heating to the pre-compressor duct in response to a temperature of the pre-compressor duct wall being greater than the dew point temperature. In one example, decreasing heating may include decreasing an opening of a coolant valve to decrease delivery of engine coolant to the pre-compressor duct wall. In another example, decreasing heating may include deactivating (e.g., turning off) an electric heating element embedded in a wall of the pre-compressor duct.

Turning to FIG. 4, graph 400 shows example adjustments to a coolant valve based on condensate formation in the freestream or at a wall of a pre-compressor duct. Specifically, graph 400 shows changes in a temperature at the pre-compressor duct wall, $T_{wall}$, at plot 402, changes in temperature of the EGR and intake air mixture, $T_{mix}$, at plot 404, and changes in a position of the coolant valve at plot 408. In the example shown in FIG. 4, condensate formation at the pre-compressor duct wall may be indicated when the pre-compressor duct wall temperature is lower than the dew point temperature, T1. Then, the controller may adjust the coolant valve in response to the pre-compressor duct wall temperature being lower than the dew point temperature T1. However, in alternate example, adjustments to the coolant valve may be made before the pre-compressor duct wall temperature decreases below the dew point temperature. In this way, control of the coolant valve may maintain a more stable pre-compressor duct wall temperature. Additionally, in the example presented herein, the dew point temperature T1 remains at a steady level; however, in alternate examples the dew point temperature T1 may change based on humidity, temperature, and pressure at the pre-compressor duct. As shown in FIG. 4, the coolant valve may be adjusted between and open and closed position. However, in alternate examples, the coolant valve may be adjusted into a plurality of positions between fully opened and fully closed.

Prior to time t1, the coolant valve is closed and thus, no heated engine coolant is being delivered to the pre-compressor duct (plot 408). Between time t1 and time t2, $T_{mix}$ and $T_{wall}$ decrease (plots 404 and 402). Then, at time t1, $T_{wall}$ decreases below the dew point temperature T1 (plot 402). In response, the controller opens the coolant valve to flow heated engine coolant to the pre-compressor duct. In one example, heated engine coolant may flow from the EGR valve and then through the pre-compressor duct wall. In another example, heated engine coolant may flow from an engine coolant path and into the pre-compressor duct wall without first passing through the EGR valve. As heated engine coolant flows to the pre-compressor duct wall, $T_{wall}$ increases. At time t2, $T_{wall}$ increases above the dew point temperature, thereby indicating that condensate formation is less than a threshold (plot 402). As a result, the controller closes the coolant valve to stop coolant flow to the pre-compressor duct, thereby decreasing heating of the pre-compressor duct wall (plot 408).

As shown at time t1 in FIG. 4, a flow of engine coolant to a pre-compressor duct wall may be increased responsive to a temperature of the pre-compressor duct wall decreasing below a dew point temperature. In another example, the flow of engine coolant to the pre-compressor duct wall may not be increased responsive to the temperature of the pre-compressor duct being above the dew point temperature.

As shown at time t1 in FIG. 4, increasing the flow of engine coolant includes adjusting a coolant valve to fully open. In one embodiment, an exhaust gas recirculation valve housing is integrated into the pre-compressor duct wall and the coolant valve is positioned in a coolant path coupled between the EGR valve housing and the pre-compressor duct. In this embodiment, when the coolant valve is opened heated engine coolant flows through the coolant path, through the pre-compressor duct wall, and then returns to an engine cooling system. In another embodiment, the coolant valve may be positioned in a coolant path, the coolant path coupled to an engine cooling circuit and passing through the pre-compressor duct wall. In this embodiment, when the coolant valve is opening, heated engine coolant flows through the coolant path and then returns to the engine cooling system.

Further, as shown at time t2, the flow of engine coolant may be decreased responsive to the temperature of the pre-compressor duct wall increasing above the dew point temperature. In one example, decreasing the flow engine coolant includes adjusting the coolant valve to fully close and stop delivering heated engine coolant to the exhaust gas recirculation valve and the pre-compressor duct wall. As described above, the temperature of the pre-compressor duct wall may be estimated based on one or more of a temperature of air in a pre-compressor duct, a temperature of gases exiting an exhaust gas recirculation system and entering the pre-compressor duct, a flow rate of gas through the exhaust gas recirculation system, an air flow rate, a vehicle speed, and an ambient air temperature.

In this way, auxiliary heat may be supplied to the pre-compressor duct in order to reduce condensate formation at the pre-compressor duct wall and subsequent degradation of the compressor wheel. In one example, heat may be provided by heated engine coolant flowing through a coolant line segment passing through the pre-compressor duct wall. The delivery of heated engine coolant to the pre-compressor duct wall may be controlled by adjusting a coolant valve positioned in the heated coolant line. The coolant valve may be opened to increase heating to the pre-compressor duct wall in response to the pre-compressor duct wall temperature decreasing below the dew point temperature. Additionally, the heated coolant line may pass through an EGR valve integrated into the pre-compressor duct. As such, the EGR valve may be cooled by the engine coolant and then the pre-compressor duct wall may be heated by the heated engine coolant. In this way, heating the pre-compressor duct may reduce condensate formation at the pre-compressor duct wall, thereby reducing degradation of the compressor wheel due to large water droplet ingestion.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
    delivering low-pressure exhaust gas recirculation (LP-EGR) to an engine pre-compressor duct; and
    adjusting heating by engine coolant delivered to the duct separate from the LP-EGR in response to condensate formation in the pre-compressor duct, including in response to an amount of LP-EGR, by increasing opening of an engine coolant valve.

2. The method of claim 1, further comprising estimating a temperature of a wall of the pre-compressor duct, determining a dew point temperature based on operating conditions, and increasing heating in response to the temperature of the wall of the pre-compressor duct less than the dew point temperature.

3. The method of claim 2, wherein the temperature of the wall of the pre-compressor duct is based on one or more of a temperature of an intake air and recirculated air mixture in the pre-compressor duct, a temperature of gases in an exhaust gas recirculation system, an exhaust gas recirculation flow rate, an air flow rate, a vehicle speed, and an ambient air temperature.

4. The method of claim 2, wherein increasing heating includes activating an electric heating element embedded in the wall of the pre-compressor duct.

5. The method of claim 2, wherein increasing heating includes increasing a delivery rate of the engine coolant to the wall of the pre-compressor duct.

6. The method of claim 5, wherein increasing the delivery rate of engine coolant includes increasing an opening of an engine coolant valve, the engine coolant valve fluidically coupled to an annulus around the wall of the pre-compressor duct upstream of the annulus.

7. The method of claim 6, wherein the engine coolant valve is positioned in a coolant line flowing between an exhaust gas recirculation valve and the wall of the pre-compressor duct.

8. The method of claim 1, wherein the engine coolant valve further adjusts flow of the engine coolant through an EGR valve.

9. The method of claim 6, further comprising decreasing heating in response to the wall temperature greater than the dew point temperature, wherein decreasing heating includes decreasing the opening of the coolant valve to decrease delivery of engine coolant to the wall of the pre-compressor duct.

10. The method of claim 8, wherein decreasing heating includes deactivating an electric heating element embedded in the wall of the pre-compressor duct.

11. A pre-compressor engine duct, comprising:
a pre-compressor duct wall including a coolant annulus positioned within and around a circumference of the pre-compressor duct wall;
an exhaust gas recirculation valve including an engine coolant connection and an exhaust gas recirculation connection on a common mounting surface, the common mounting surface coupled to the pre-compressor duct wall; and
an engine coolant path passing through a body of the exhaust gas recirculation valve and the coolant annulus.

12. The pre-compressor duct of claim 11, wherein the engine coolant path is coupled to an engine coolant circuit and wherein heated engine coolant flows passively from the engine coolant circuit, through the exhaust gas recirculation valve, through the coolant annulus, and then back to the engine coolant circuit.

13. The pre-compressor duct of claim 11, wherein the engine coolant path is coupled to an engine coolant circuit, wherein the engine coolant path includes an engine coolant valve positioned downstream of the exhaust gas recirculation valve and upstream of the coolant annulus, and wherein when the coolant valve is opened heated engine coolant flows from the engine coolant circuit, through the exhaust gas recirculation valve, through the coolant annulus, and then back to the engine coolant circuit.

14. An engine method, comprising:
increasing a flow of engine coolant to an annulus of a pre-compressor duct wall and through an EGR valve housing responsive to a temperature of the pre-compressor duct wall annulus decreasing below a dew point temperature; and
not increasing the flow of the engine coolant to the pre-compressor duct wall annulus and through the EGR valve housing responsive to the temperature of the pre-compressor duct wall being above the dew point temperature.

15. The method of claim 14, wherein increasing the flow of engine coolant includes adjusting a coolant valve to fully open.

16. The method of claim 15, wherein when the coolant valve is opened heated engine coolant flows through a coolant path, through the pre-compressor duct wall annulus, and then returns to an engine cooling system and wherein the coolant path is coupled between the EGR valve housing and the pre-compressor duct, the EGR valve housing integrated into the pre-compressor duct wall annulus.

17. The method of claim 15, wherein when the coolant valve is opened heated engine coolant flows through a coolant path, the coolant path coupled to an engine coolant circuit and passing through the pre-compressor duct wall annulus, and then returns to an engine cooling system.

18. The method of claim 14, further comprising decreasing the flow of engine coolant responsive to the temperature of the pre-compressor duct wall annulus increasing above the dew point temperature.

19. The method of claim 18, wherein decreasing the flow of engine coolant includes adjusting a coolant valve to fully close and stop delivering heated engine coolant to the EGR valve housing and the pre-compressor duct wall annulus.

20. The method of claim 14, wherein the temperature of the pre-compressor duct wall annulus is estimated based on one or more of a temperature of air in a pre-compressor duct, a temperature of gases exiting an exhaust gas recirculation system and entering the pre-compressor duct, a flow rate of gas through the exhaust gas recirculation system, an air flow rate, a vehicle speed, and an ambient air temperature.

* * * * *